United States Patent [19]

Michaylov

[11] 4,020,215

[45] Apr. 26, 1977

[54] EXTRUSION OF POLYOLEFIN ONTO PAPER AT DECREASED TEMPERATURES

[75] Inventor: Lubomir Michaylov, Castro Valley, Calif.

[73] Assignee: Crown Zellerbach Corporation, San Francisco, Calif.

[22] Filed: May 30, 1975

[21] Appl. No.: 582,340

[52] U.S. Cl. .............................. 428/420; 156/244; 156/310; 428/476; 428/513; 428/516; 428/517

[51] Int. Cl.² .................. B32B 27/10; B32B 27/32; B32B 27/30

[58] Field of Search ........... 156/244, 310; 428/420, 428/475, 476, 513, 516, 517

[56] References Cited

UNITED STATES PATENTS

| | | | |
|---|---|---|---|
| 3,076,720 | 2/1963 | Rice et al. ..................... | 428/513 X |
| 3,077,428 | 2/1963 | Heuser et al. ................. | 428/513 X |
| 3,198,692 | 8/1965 | Bridgeford ..................... | 428/420 |
| 3,230,135 | 1/1966 | Hurst ................................ | 428/342 |
| 3,510,342 | 5/1970 | Demmig et al. ............... | 428/475 X |
| 3,622,439 | 11/1971 | Manne et al. .................. | 428/420 X |
| 3,836,620 | 9/1974 | Bhuta et al. ................... | 156/244 X |
| 3,993,850 | 11/1976 | Timmerman et al. ......... | 428/476 X |

*Primary Examiner*—George F. Lesmes
*Attorney, Agent, or Firm*—Stanley M. Teigland

[57] ABSTRACT

By coating a paper substrate first with a polyalkyleneimine and then with a polymer containing groups which react chemically with the imino groups of the polyalkyleneimine, a polyolefin can be extruded onto the substrate with good adhesion at temperatures lower than the temperature that would be required to obtain the same degree of adhesion if the polymer containing the reactive groups were not present.

14 Claims, No Drawings

EXTRUSION OF POLYOLEFIN ONTO PAPER AT DECREASED TEMPERATURES

As disclosed in U.S. Pat. 3,230,135 to Hurst, an important factor in obtaining good adhesion between a paper substrate and a layer of a polyolefin extruded onto the substrate is the temperature of the polyolefin as it contacts the paper. In general, the higher the temperature of the polyolefin, the better the adhesion. However, for various reasons, including economy of operation, avoidance of degradation of the polyolefin or additives therein, and avoidance of unpleasant odors, it is desirable to minimize the temperature of the polyolefin. The Hurst patent discloses that the polyolefin may be applied at a lower temperature with good adhesion by pretreating the paper substrate with a polyalkyleneimine.

In accordance with this invention, the polyolefin may be applied at a still lower temperature with good adhesion by interposing between the polyalkyleneimine-treated paper and the polyolefin layer a layer of a polymer containing functional groups which react chemically with the imino groups of the polyalkyleneimine. Because of this chemical reaction, an indestructible bond is formed between the paper and the polymer layer. At temperatures below about 580° F, the adhesion obtained in accordance with this invention is better than the adhesion obtained in accordance with the Hurst process wherein the polyolefin is applied directly to the polyalkyleneimine-treated paper. Good results are obtained even at temperatures below 550° F, the minimum temperature recited in the Hurst patent. The temperature of the polyolefin is preferably from about 500° to 580° F.

The Hurst patent gives a good description of the polyalkyleneimine and its application to the paper substrate. The polyalkyleneimine may be applied to the paper as a solution in water or other suitable solvent in accordance with any convenient method, such as roll coating, spraying or the like. The polyalkyleneimine is applied such that it is deposited on the paper in an amount of from about 0.005 to 1.0, preferably about 0.01 to 0.05, pounds per ream, on a dry basis. The concentration of the polyalkyleneimine in the solution is preferably from about 0.05 to 3.0, more preferably from about 0.15 to 0.70, percent by weight. The molecular weight of the polyalkyleneimine may range from about 800 to about 100,000, and preferably is from about 30,000 to 80,000. The polyalkyleneimine forms a coating on the paper, although some of the polyalkyleneimine will of course penetrate below the surface of the paper.

Suitable polyalkyleneimines include polyethyleneimine, polypropyleneimine, polybuteneimine, polyisobutyleneimine, and poly-N-methylethyleneimine. Polyethyleneimine is preferred.

In Table 1 below are listed functional groups which react chemically with imino groups, and opposite each functional group a representative polymer which contains the functional group.

Table 1

| Functional Group | Polymer |
| --- | --- |
| carboxyl | ethylene-acrylic acid copolymer |
| anhydride | styrene-maleic anhydride copolymer |
| carbonyl | polycarbonate |
| halide | chlorinated polyethylene |
| isocyanate | polyurethane |

Table 1-continued

| Functional Group | Polymer |
| --- | --- |
| vinyl | 1,2-polybutadiene |
| cyano | styrene-acrylonitrile copolymer |

In order to provide sufficient sites for reaction with the imino groups, the proportion of functional groups in the polymer is preferably at least one mole percent, and may be up to about 25 mole percent.

Inasmuch as the purpose of the polymer containing functional groups is simply to act as a tie layer between the polyalkyleneimine-treated paper and the polyolefin layer, only a thin coating is required. The thickness of the coating is preferably that corresponding to about 0.5 to 3.0 pounds per ream.

The polymer containing functional groups may be applied to the polyalkyleneimine-treated paper in accordance with any convenient method, such as by coating the paper with the polymer dissolved or dispersed in a suitable medium, or by extruding the polymer onto the paper. In preferred embodiments, the polymer is coextruded with the polyolefin.

Polymers in which the functional groups are carboxyl groups are preferred. The carboxyl groups react with the imine groups to form imide groups. Particularly suitable polymers include copolymers of styrene or alpha olefins with alpha, beta ethylenically unsaturated carboxylic acids. Suitable alpha olefins have the formula $RCH=CH_2$ wherein R is hydrogen or an alkyl group having 1 to 3 carbon atoms, with ethylene being preferred. The carboxylic acid has from 3 to 8 carbon atoms and has one or two carboxyl groups, which together may form an anhydride. Examples of such monomers are acrylic acid, methacrylic acid, ethacrylic acid, itaconic acid, maleic acid, maleic anhydride, fumaric acid, and monoesters of such dicarboxylic acids such as methyl maleate and ethyl fumarate. The acid monomer preferably forms from about 1 to 25 mole percent of the copolymer. The copolymer may be either a random, block or graft copolymer. The melt index of the copolymer is preferably from about 5 to 30 (ASTM D-1238). A portion of the carboxyl groups may be neutralized with a metal ion or esterified. Thus, ionic copolymers, such as disclosed in U.S. Pat. Nos. 3,322,734 and 3,355,319, are also suitable. The ionic copolymers have distributed therein a metal ion having an ionized valence of 1 to 3. The acid polymer preferably contains from 1 to 25 percent by weight of free carboxyl groups. Preferred copolymers include ethylene-acrylic acid and ethylene-methacrylic acid copolymers.

In preferred embodiments, the paper substrate has a basis weight of from about 25 to 50 pounds per ream.

The polyolefin layer is preferably applied to the paper by coextrusion with the polymer containing functional groups. The polyolefin may contain a minor amount of another unsaturated monomer, such as vinyl acetate, copolymerized therewith, and may contain fillers, pigments or other additives. The polyolefin preferably has a melt index of from about 5 to 30. Polyethylene is preferred.

The thickness of the polyolefin layer depends on the particular end use of the laminate. For packaging applications, the polyolefin preferably has a thickness of from about 0.5 to 4 mils, corresponding to a basis weight of about 8 to 64 pounds per ream. For electrostatic recording elements, the thickness is preferably from about 0.05 to 0.5 mil.

Electrostatic recording elements represent a particularly significant embodiment of this invention. There are two types of electrostatic recording elements: electrographic and electrophotographic. Electrographic recording elements comprise an electrically conductive base sheet coated with a dielectric layer. The dielectric layer may be a layer of a polymer extruded onto the base sheet, as disclosed in U.S. Pat. Nos. 3,520,771 and 3,634,135. Electrophotographic recording elements comprise an electrically conductive base sheet coated with a dielectric layer containing photoconductive particles dispersed therein. U.S. Pat. Nos. 3,501,330 and 3,522,041 disclose methods of manufacturing electrophotographic recording elements by extruding a molten polymer containing photoconductive particles onto conductive paper.

When the dielectric polymer layer is extruded directly onto the conductive paper, as illustrated in the above four patents, delamination is a problem due to poor adhesion between the paper and the polymer. The problem may be mitigated by increasing the extrusion temperature, but increased temperatures cause degradation of the extrudate, especially when it contains additives, such as photosensitive particles or fillers which improve the printability of the surface. Hurst partially solves the problem by precoating the paper with a polyalkyleneimine. This invention further solves the problem by interposing between the dielectric layer and the polyalkyleneimine-treated paper a layer of a polymer containing groups which react with the imino groups of the polyalkyleneimine.

Conductive paper employed in the manufacture of electrostatic recording elements is well known. Such paper has a surface resistivity of less than about 50 megohms per square, and is usually prepared by impregnating the paper with a water soluble conductive salt, such as sodium nitrate. The salt is normally applied to the paper by treating it with an aqueous solution of the salt. By adding polyalkyleneimine to the solution, the salt and the polyalkyleneimine may conveniently be applied simultaneously to the paper substrate. In a preferred embodiment, the polyolefin dielectric layer is applied to the conductive paper by coextrusion with another polyolefin layer which contains material which improves the printability of the surface. In an especially preferred embodiment, these two layers are coextruded with the polymer containing the functional groups.

In the following example, the abbreviation "ppr" stands for pounds per ream.

EXAMPLE

Bond paper having a basis weight of 32 ppr was treated with an aqueous solution of sodium nitrate and polyethyleneimine. The concentrations of the sodium nitrate and the polyethyleneimine were 35 and 0.6% by weight, respectively. On a dry basis, the paper was impregnated with 2.6 ppr of sodium nitrate and coated with 0.01 ppr of polyethyleneimine. The polyethyleneimine had a molecular weight of about 60,000. After being dried, the paper was coated with three polymer layers by simultaneous coextrusion. In order of their proximity to the paper, these three layers were a layer of 0.6 ppr of Surlyn 1652, 3.3 ppr of polyethylene melt index of 150 and containing 40 phr of clay. The extrusion temperatures of the three resins were 530°–540°, 550°, and 450° F respectively. Surlyn 1652 is a duPont trademark for a copolymer of ethylene and 6 mole percent methacrylic acid having zinc ions distributed therein. The resultant electrographic paper was tested for performance on a commercial electrostatic printer. The paper performed at least as well as commercially available electrographic paper. When the laminate was tested for bond strength, the polymer layer ruptured and no delamination occurred.

COMPARATIVE EXAMPLE

When the above example is repeated omitting the Surlyn layer, the laminate can be easily peeled apart by hand.

I claim:
1. A laminate comprising successively
   a. a paper substrate coated with a polyalkyleneimine,
   b. a layer of a polymer containing functional groups which react chemically with the imino groups of the polyalkyleneimine, the functional groups constituting from about 1 to 25 mole percent of the polymer, and
   c. a layer of a polyolefin.
2. The laminate of claim 1 wherein the functional groups are carboxyl groups.
3. The laminate of claim 2 wherein the polymer containing carboxyl groups is a copolymer of an alpha olefin and an alpha, beta ethylenically unsaturated carboxylic acid.
4. The laminate of claim 3 wherein the copolymer is a copolymer of ethylene and acrylic acid or methacrylic acid.
5. The laminate of claim 4 wherein the polyalkyleneimine is selected from the group consisting of polyethyleneimine, poly-propyleneimine, polybuteneimine, polyisobutyleneimine, and poly-N-methylethyleneimine.
6. The laminate of claim 4 wherein the copolymer has distributed therein a metal ion having an ionized valence of 1 to 3.
7. The laminate of claim 6 wherein the polyalkyleneimine is polyethyleneimine.
8. The laminate of claim 7 wherein the polyolefin is polyethylene.
9. The laminate of claim 8 wherein the paper substrate is electrically conductive.
10. The laminate of claim 9 wherein the laminate is an electrostatic recording element.
11. The laminate of claim 10 wherein the laminate is an electrographic recording element.
12. In a method of extruding a layer of polyolefin onto a paper substrate coated with a polyalkyleneimine, the improvement of interposing between the coated substrate and the polyolefin layer a layer of a polymer containing 1–25 mole percent functional groups which react chemically with the imino groups of the polyalkyleneimine and extruding the polyolefin layer at a temperature of from about 500° to 580° F.
13. The improvement of claim 12 wherein the polymer containing functional groups is coextruded with the polyolefin.
14. The improvement of claim 13 wherein the extrusion temperature of the polyolefin is from about 500° to 550° F.

* * * * *